(12) United States Patent
Cavins et al.

(10) Patent No.: US 12,351,418 B2
(45) Date of Patent: Jul. 8, 2025

(54) SPINDLE FREE TAPE ARTICLE AND METHOD

(71) Applicant: H.B. Fuller Company, St. Paul, MN (US)

(72) Inventors: Orion A. Cavins, Vancouver, WA (US); Jorge A. Nash, Vancouver, WA (US)

(73) Assignee: H.B. Fuller Company, St. Paul, MN (US)

( * ) Notice: Subject to any disclaimer, the term of this patent is extended or adjusted under 35 U.S.C. 154(b) by 489 days.

(21) Appl. No.: 17/754,634

(22) PCT Filed: Oct. 7, 2020

(86) PCT No.: PCT/US2020/054589
§ 371 (c)(1),
(2) Date: Apr. 7, 2022

(87) PCT Pub. No.: WO2021/071956
PCT Pub. Date: Apr. 15, 2021

(65) Prior Publication Data
US 2022/0363508 A1    Nov. 17, 2022

Related U.S. Application Data

(60) Provisional application No. 62/911,564, filed on Oct. 7, 2019.

(51) Int. Cl.
*B65H 45/20* (2006.01)
*C09J 7/10* (2018.01)

(52) U.S. Cl.
CPC ............. *B65H 45/20* (2013.01); *C09J 7/10* (2018.01); *B65H 2301/11* (2013.01);
(Continued)

(58) Field of Classification Search
CPC .... B65H 2301/11; B65H 2301/412845; B65H 2301/46312; B65H 2515/31;
(Continued)

(56) References Cited

U.S. PATENT DOCUMENTS 1,670,254 A * 5/1928 Gowin ................... G09B 29/04
281/5
4,458,814 A * 7/1984 Meschi .............. B65H 45/1015
206/820

(Continued)

FOREIGN PATENT DOCUMENTS

| JP | 2005153943 | 6/2005 |
| JP | 2006036287 | 2/2006 |

(Continued)

*Primary Examiner* — Philip C Tucker
*Assistant Examiner* — Brian R Slawski
(74) *Attorney, Agent, or Firm* — Daniel J. Barta; Kirsten Stone

(57) ABSTRACT

An adhesive web article including an adhesive web defining a first surface, a second surface, a first end, a second end, a length in between, and an adhesive layer defining a first adhesive surface. The adhesive web is folded over upon itself along the length such that a first portion of the first adhesive surface is in facing relationship with a second portion of the first adhesive surface.

10 Claims, 8 Drawing Sheets

(52) U.S. Cl.
CPC ............ *B65H 2301/412845* (2013.01); *B65H 2301/46312* (2013.01); *B65H 2515/31* (2013.01); *B65H 2701/1824* (2013.01); *C09J 2301/304* (2020.08)

(58) Field of Classification Search
CPC ............. B65H 2701/1824; B65H 45/20; C09J 2301/304; C09J 7/10
USPC ......... 156/60, 196, 199, 204, 205, 208, 227, 156/308.2, 309.6, 324; 428/40.1, 121, 428/124, 343, 346, 347, 349, 126; 281/2, 281/5; 221/47, 48
See application file for complete search history.

(56) References Cited

U.S. PATENT DOCUMENTS

| | | | |
|---|---|---|---|
| 4,533,926 A | | 8/1985 | Foldvari et al. |
| 4,631,552 A | | 12/1986 | Kobayashi |
| 4,768,810 A | * | 9/1988 | Mertens .................... G09F 3/10 |
| | | | 428/126 |
| 4,828,636 A | * | 5/1989 | Rausing .................. B42C 19/06 |
| | | | 412/37 |
| 4,955,640 A | * | 9/1990 | Anderson ............. G09F 3/0289 |
| | | | 283/105 |
| 4,996,184 A | * | 2/1991 | Bevan .................. B41M 5/1246 |
| | | | 281/5 |
| 5,865,925 A | * | 2/1999 | Lindsay ................. B43M 5/047 |
| | | | 156/227 |
| 5,941,451 A | * | 8/1999 | Dexter .................... B42D 15/08 |
| | | | 229/92.1 |
| 6,025,045 A | * | 2/2000 | Langeman ............... B05D 1/32 |
| | | | 428/40.1 |
| 6,102,842 A | | 8/2000 | Harris, Jr. |
| 6,129,387 A | * | 10/2000 | Chess .................... B42D 15/00 |
| | | | 229/72 |
| 6,142,288 A | | 11/2000 | Hotkowski et al. |
| 6,235,366 B1 | * | 5/2001 | Matsumoto ......... H01L 21/6836 |
| | | | 428/354 |
| 6,641,910 B1 | | 11/2003 | Bries et al. |
| 6,842,934 B1 | * | 1/2005 | McKay, Jr. ........... A47L 25/005 |
| | | | 428/126 |
| 6,860,309 B2 | | 3/2005 | Hartman et al. |
| 7,007,883 B2 | | 7/2006 | Fairchild |
| 7,104,493 B2 | | 9/2006 | Fairchild |
| 7,204,910 B2 | | 4/2007 | Foubert et al. |
| 7,322,541 B2 | | 1/2008 | Fairchild |
| 7,461,808 B2 | | 12/2008 | Bradshaw et al. |
| 7,934,675 B2 | | 5/2011 | Mailyan et al. |
| 8,070,087 B2 | | 12/2011 | Maness et al. |
| 8,544,757 B2 | * | 10/2013 | Stahl ...................... G06Q 30/00 |
| | | | 235/487 |
| 8,550,395 B2 | | 10/2013 | Nash et al. |
| 8,807,474 B2 | | 8/2014 | Nash et al. |
| 8,986,831 B2 | | 3/2015 | Bradshaw et al. |
| 9,189,978 B2 | | 11/2015 | Tararyan et al. |
| 9,340,388 B2 | | 5/2016 | Nash et al. |
| 9,393,753 B2 | | 7/2016 | Pettersson |
| 9,969,142 B2 | | 5/2018 | Pettersson et al. |
| 2005/0103425 A1 | * | 5/2005 | Harms .................... G09F 15/00 |
| | | | 156/227 |
| 2006/0257607 A1 | | 11/2006 | Crooks et al. |
| 2008/0056799 A1 | | 3/2008 | Nureki et al. |
| 2009/0197051 A1 | * | 8/2009 | Swan .......................... C09J 7/35 |
| | | | 428/182 |
| 2013/0260090 A1 | * | 10/2013 | Windorski ................ B32B 3/04 |
| | | | 156/227 |
| 2017/0274695 A1 | * | 9/2017 | Menashe ................ B65H 45/30 |
| 2018/0118407 A1 | | 5/2018 | Nash et al. |

FOREIGN PATENT DOCUMENTS

| | | |
|---|---|---|
| JP | 2007030182 | 2/2007 |
| JP | 2007237565 | 9/2007 |

* cited by examiner

SPINDLE FREE TAPE ARTICLE AND METHOD

FIELD

The present disclosure relates generally to web handling. More particularly, the present disclosure relates to handling adhesive tape.

BACKGROUND

Web handling is used in many industries. When assembling a device that includes a web as a component of the device, a system for handling the web is needed to ensure the web is handled in an efficient and controlled manner. For example, the web often will need to be positioned correctly before and while the web is added to the device.

One example web that is used in industry is a tape, such as an adhesive tape. Adhesive tapes can be used in the packaging industry, for example for constructing a cardboard substrate. Additionally, or alternatively, adhesive tape can be used to configure the cardboard into a container, and for closing the container. An example system for handling webs, such as adhesive tapes, includes unrolling the adhesive tape from a roll that the adhesive tape has been wound into. Often, webs that are wound into a roll have to be placed onto a dispensing device, such as a shaft in order to rotate the roll and dispense the web.

Webs that have been wound into a roll may present certain difficulties when being handled. For example, rotating the roll to dispense the web can also present further difficulties such as controlling the rotational speed or the inertia of the roll as it is turning.

Splicing a first roll of web to a second roll of web may require certain specialized equipment or joining devices to attach an idle web to a rotating web. Splicing systems often require operators to place their hands around rotating webs to connect the idle roll to the rotating roll. The splice or web can fail when the rotating roll starts the idle roll due to the load required to start the idle roll. Often festoons are used to accumulate lengths of web to aid in starting the idle or stop a running roll. These festoons require the web to travel through a series of pulleys with which the web might tangle and the splice device can catch on. A splice can create a thick portion in the web and often requires removal to ensure converting equipment does not jam. This removal process causes waste and downtime. The splice also is a thick section of web that can get caught in the dispensing process. If caught, it will often break, causing downtime and waste.

There is a need for an article, system or method for dispensing a web that does not require unwinding the web to join one or more webs together. There is also a need for a solution to the problems associated with dispensing speed, angular momentum, and splicing that is present when handing rolled webs.

SUMMARY

Disclosed herein is an adhesive web article. The adhesive web article includes an adhesive web defining a first surface, a second surface, a first end, a second end, a length in between, and an adhesive layer defining a first adhesive surface. The adhesive web is folded over upon itself along the length such that a first portion of the first adhesive surface is in facing relationship with a second portion of the first adhesive surface. In some instances, the first portion of the first adhesive surface is in direct contact with the second portion of the first adhesive surface. In some instances, the adhesive web further includes a second adhesive surface opposite the first adhesive surface. In some instances, a first portion of the second adhesive surface is in facing relationship with a second portion of the second adhesive surface. In some instances, the adhesive layer is free of self-adhesion at room temperature. In some instances, the adhesive layer includes a hot melt adhesive. In some instances, the adhesive web further includes a carrier. In some instances, the adhesive web is free of a carrier.

Disclosed herein is an adhesive web article including a web having a first side, a second side opposite the first side, a first end, a second end, and a length in between. The web includes a self-supporting adhesive. The web is folded over upon itself along the length of the web. In some instances, the web is in the form of a fan-fold along the length of the web. In some instances, the adhesive defines a first surface of the web. In some instances, a first portion of the adhesive is in direct contact with a second portion of the adhesive. In some instances, the web includes a second adhesive along the second side of the web. In some instances, a second adhesive defines a second surface of the web. In some instances, the first side of the web is free of contact with the second side of the web. In some instances, the adhesive web article is free of a spindle. In some instances, the web is not in a wound form. In some instances, the web is not wound onto a core. In some instances, the web is free of a liner. In some instances, the web article further includes a liner adjacent to the adhesive. In some instances, the adhesive is free of self-adhesion at room temperature. In some instances, the adhesive is not tacky to the touch at room temperature. In some instances, the adhesive is an activatable adhesive. In some instances, the adhesive is a hot melt adhesive. In some instances, the web further includes a carrier. In some instances, the web is free of a carrier. In some instances, the web has a tensile strength, as measured along the length of the web, of about 1.75 N per cm (about one pound-force (lbf) per inch) width to about 438 N per cm (about 250 lbf per inch) width. In some instances, the web is configured to be connected with a first end of a second web without unfolding the web. In some instances, the web article further includes a first support frame configured to support the web.

Disclosed herein is an adhesive web article including a web having a first side and a second side opposite the first, a first end, a second end, and a length in between. The adhesive web article includes a carrier having a first side and a second side opposite the first side, and an adhesive positioned along the first side of the carrier. The web is folded along the length of the web such that a first section of the adhesive is in facing relationship with a second section of the adhesive. In some instances, the adhesive defines a first surface of the web. In some instances, the web is in the form of a fold along the length of the web such that a first section of the adhesive is in direct contact with a second section of the adhesive. In some instances, the web is in the form of a fan-folded along the length of the web. In some instances, the first side of the web is free of contact with the second side of the web. In some instances, the adhesive web article is free of a spindle. In some instances, the web is not in a wound form. In some instances, the adhesive web article is free of a core. In some instances, web is free of a liner. In some instances, the adhesive is free of self-adhesion at room temperature. In some instances, the adhesive is not tacky to the touch at room temperature. In some instances, the adhesive is an activatable adhesive. In some instances, the adhesive is a hot melt adhesive. In some instances, the web has a tensile strength, as measured along the length of the web, of about 1.75 N per cm (about one lbf per inch) width to about 438 N per cm (about 250 lbf per inch) width. In some instances, a second end of the web is configured to be connected with a first end of a second web without unfolding the web. In some instances, the adhesive web further includes a first support frame configured to support the web.

Disclosed herein is a method of applying an adhesive web. The method includes unfolding a web having a first side, a second side opposite the first side, a first end, a second end, and a length in between. The web includes a self-supporting adhesive. The web is folded over upon itself along the length of the web. The method includes applying the web such that the adhesive contacts a substrate. In some instances, the method includes activating the adhesive before applying the web. In some instances, the web is in the form of a fan-fold along the length of the web. In some instances, the adhesive defines a first surface of the web. In some instances, the web is in the form of a fold over upon itself such that a first section of the first side of the web is in direct contact with a second section of the first side of the web. In some instances, the first side of the web is free of contact from the second side of the web. In some instances, the web includes a second adhesive along the second side of the web. In some instances, the second adhesive defines a second surface of the web. In some instances, the method includes cutting the web to form a section of web and applying the section of web to the substrate. In some instances, the method is free of unwinding the web. In some instances, the method is free of rotating the web about a spindle. In some instances, the web is free of a wound form before the step of unfolding the web. In some instances, the web is free of a liner. In some instances, the adhesive is not tacky to the touch at room temperature. In some instances, the adhesive is an activatable adhesive. In some instances, the adhesive is a hot melt adhesive. In some instances, the web further includes a carrier. In some instances, the web is free of a carrier. In some instances, the web has a tensile strength, as measured along the length of the web, of about 1.75 N per cm (about one lbf per inch) width to about 438 N per cm (about 250 lbf per inch) width. In some instances, the web is in the form of a fold such that a second end of the web is configured to be connected with a first end of a second web without unfolding the web.

Disclosed herein is method of applying an adhesive web. The method includes drawing a web having a first side and a second side opposite the first side, a first end, a second end, and a length in between. The web includes a carrier having a first side and a second side opposite the first side, and an adhesive positioned along the first side of the carrier. The web is folded along the length of the web such that a first section of the adhesive is in facing relationship with a second section of the adhesive. In some instances, the method includes activating the adhesive. In some instances, the method includes applying the adhesive web to a substrate. In some instances, the web includes a first surface, a second surface opposite the first surface, and the second surface is free of contact with the first surface. In some instances, the web is in the form of a fold along the length of the web such that a first section of the adhesive is in direct contact with a second section of the adhesive. In some instances, the adhesive defines a first surface of the web. In some instances, the method includes a second adhesive along a second side of the carrier opposite the first side of the carrier. In some instances, wherein the second adhesive defines a second surface of the web. In some instances, the adhesive web is in a fan-folded form along the length of the web before the step of drawing the web. In some instances, drawing the web includes unfolding the web. In some instances, the method is free of unwinding the web. In some instances, the method is free of rotating the web about a spindle. In some instances, the web is free of a liner. In some instances, the adhesive web has a tensile strength, as measured along the length of the web, of from about 1.75 N per cm (about one lbf per inch) width to about 438 N per cm (about 250 lbf per inch) width.

DETAILED DESCRIPTION

The present disclosure provides a web arranged such that the web can be dispensed without the use of a spindle. The web is in a folded form along the length of the web. The web may be an adhesive tape that includes an adhesive along a first surface of the web. The adhesive does not self-adhere at room temperature. Two or more webs can be connected as a dispensing system configured to provide a continuous length of web.

Figure 1:
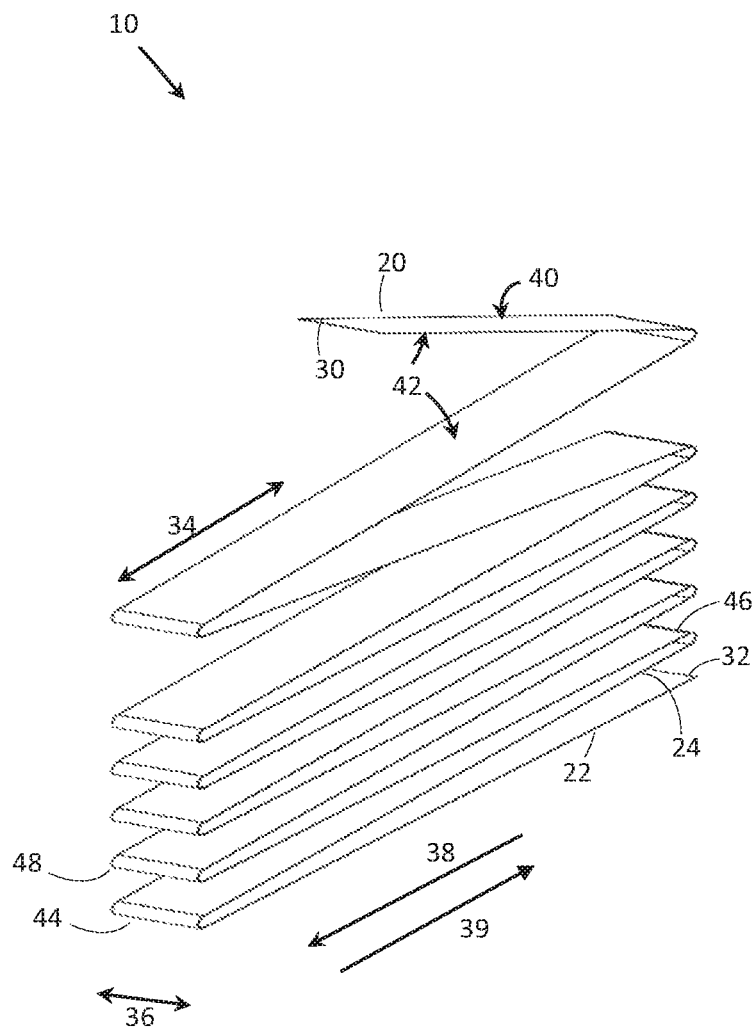
FIG. 1 is a perspective view of a web arranged in accordance with certain embodiments.

FIG. 1 is a perspective view of a stack 10 that includes a web 20 that is folded. As shown, the web 20 has a first end 30, a second end 32, a length extending between the first end 30 and second end 32 (the direction of the length of the web 20 is generally shown by the arrow 34 along a portion of the length of the web 20). The length of the web 20 can include a first section 22, a second section 24, a width as shown in by the direction of the arrow 36, a first surface 40, and a second surface 42.

The stack 10 includes the web 20 in a folded form. The web 20 can be in a folded arrangement along its length such that the first section 22 extends in a first direction as shown by the arrow 38, and the second section 24 extends in a second direction as shown by the arrow 39. In some embodiments, the arrangement of the first section 22 extending in a first direction and the second section 24 extending in a second direction can define one fold. As shown, with the web 20 in a folded arrangement, a first turn 44 is positioned where the web 20 changes from extending from the first direction to the second direction, a second turn 46 where the web changes from extending from the second direction to the first direction, and a third turn 48 where the web 20 changes from extending from the first direction to the second direction. In some embodiments, the web 20 can be folded multiple times in a back and forth alternating direction, creating multiple folds. The web 20 can be repeatedly folded such that the web 20 is arranged into multiple adjacent folds and forms the stack 10.

As shown in FIG. 1, the first direction shown by the arrow 38 can be positioned such that it is generally parallel to the second direction shown by the arrow 39. The web 20 that is folded in this arrangement creates a form of a fold that is referred to herein as a fanfold. That is, a fanfold includes a folded arrangement wherein the web 20 alternatively extends in a first direction and is then folded such that the web extends in a second direction that is the counter direction to the first direction. The web 20 can then be folded such that the web 20 extends again in the first direction. In some instances, the folding arrangement alternately includes a fold, then counter fold, then a fold, continuously along the length of the web 20 such that the web 20 is in a folded arrangement along substantially the entire length of the web 20.

The stack 10 is shown in FIG. 1 with the second end 32 of the web 20 in one possible position. Further positions or arrangements of the web 20 are contemplated, such as with the second end 32 positioned under the stack 10, beside the stack 10, or in any suitable arrangement such that a user can access the second end 32 without unfolding the web 20 from the stack 10.

Figure 2:
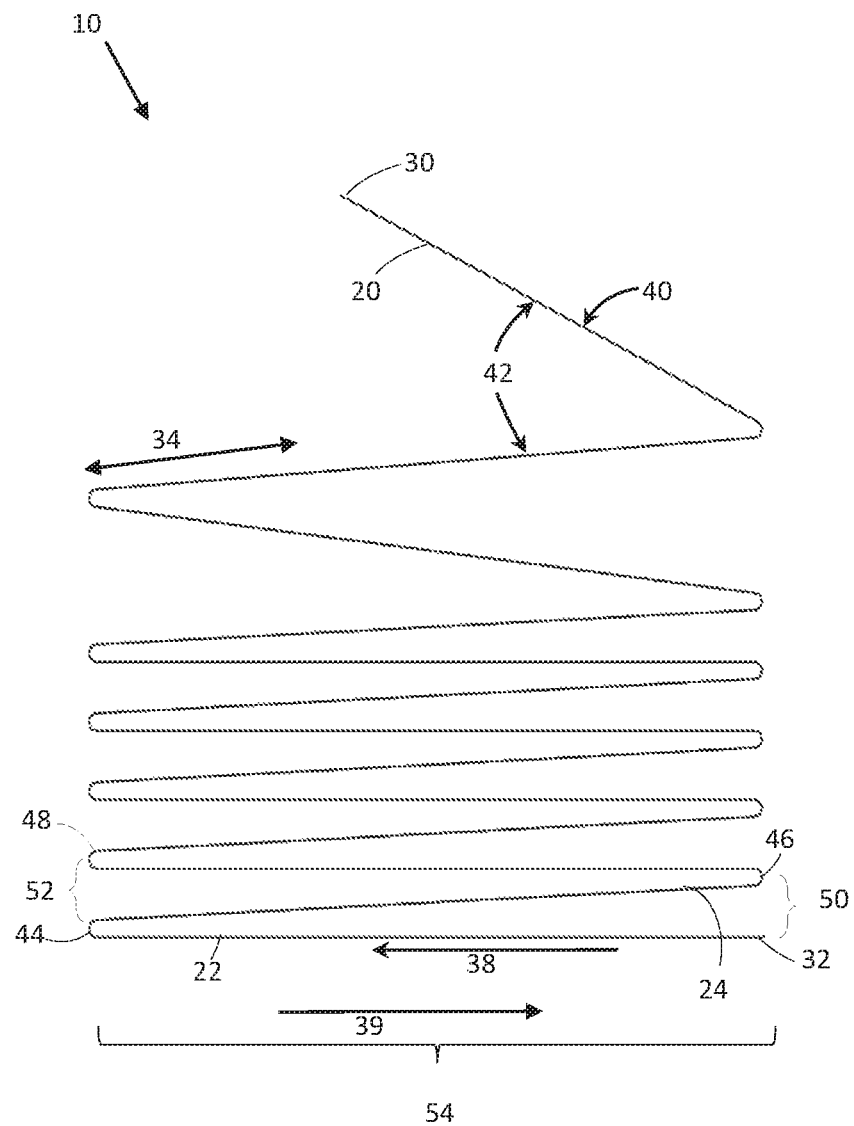
FIG. 2 is a front view of a web arranged in accordance with certain embodiments.

FIG. 2 is a front view of the stack 10 of FIG. 1. FIG. 2 shows the web 20, first end 30, second end 32, length extending generally along the direction of the arrow 34, first section 22, second section 24, first surface 40, and second surface 42. The web 20 is in a folded form that includes the first fold 50, and second fold 52. FIG. 2 shows the first turn 44 and third turn 48 where the web 20 changes from extending in the first direction (shown by the arrow 38) to the second direction (shown by the arrow 39), and the second turn 46 where the web changes from extending in the second direction to the first direction. The length of one section, for example the first section 22, defines the stack length 54. Typically, the width of the stack 10 is defined by the width of the web 20. The stack length and the width of the stack define the footprint of the stack 10.

As shown, the portion of the web 20 that extends between the second end 32 and the second turn 46 generally defines the first fold 50. The first fold 50 includes the portion of the web 20 that is in facing relationship with itself along its length, and defines the first section 22 and second section 24. As shown, the first fold 50 includes a portion of the web 20 where web 20 is folded over on itself such that the first surface 40 faces itself. The portion of the web 20 that extends between the first turn 44 and the third turn 48 generally defines a second fold 52. As shown, the second fold 52 includes a portion of the web 20 where the web 20 is folded over on itself such that the second surface 42 faces itself.

As shown, the web 20 is in a form that is folded such that the portion of the first surface 40 along the first section 22 is in a facing relationship with the portion of the first surface 40 along the second section 24. The web 20 can be in a form that is folded such that a first portion of the second surface 42 is in a facing relationship with a second portion of the second surface 42.

In some embodiments, the web 20 can be folded such that the first surface 40 is in facing relationship and in contact with itself, and the second surface 42 is facing relationship and in contact with itself, such as along alternating folds. As shown, when the web 20 is in a folded form, the first surface 40 of the web 20 is free of contact with the second surface 42 of the web 20.

Typically, arranging the web 20 in a folded form, such as the stack 10, positions the web 20 such that the footprint of the stack 10 occupies a smaller area than if the web 20 was not folded. Generally, the size of the footprint can be the area defined by the stack length 54 multiplied by the width of the stack (which typically corresponds to the width of the web 20, shown by the arrow 36 in FIG. 1).

In some embodiments, the web 20 can be removed from the stack 10 by pulling the web 20 such that it unfolds. One process for dispensing the web 20 may be to pull the web 20 at the first end 30 such that the web 20 unfolds one fold at a time until the entire length of the web 20 has been drawn from the stack 10.

As shown in FIGS. 1 and 2, the stack 10 is free of a core or central axis around which the web 20 would be wound. As the web 20 is not wound around a central axis, the web 20 can be removed from the stack 10 without rotating the web 20 around the central axis.

Generally, a web that is in a wound form, for example wound around an axis, can be unwound by rotating the web around the axis such that the web is dispensed. Often, an apparatus for unwinding a wound web includes a spindle. As used herein, a spindle is a shaft, such as a rod or pin serving as an axis, that revolves, or on which something revolves. For example, a spindle may include a shaft that a wound web can be mounted on and around which the web can rotate as the web is unwound. The web can be wound around a core, or in some examples can be wound without a core. In some instances, a spindle can include a web wound around a core, and the core can be configured to rotate around a shaft to dispense the web from the core, or the spindle with web wound on the core can rotate together to unwind the web. In some instances, a spindle could include a web wound around a central axis and free of a core, and the wound web can rotate around a shaft such that the web unwinds, or the spindle and wound web can rotate together to unwind the web.

In some embodiments, having the web 20 dispensed without the use of a spindle allows a user to draw the web 20 from a web source while controlling the amount of tension that is applied along the length of the web 20. For example, often when a web is arranged around an axis, pulling the web causes the web to rotate and the roll of web gains angular momentum. The angular momentum gained as the web is being pulled can cause the web to continue rotating around the axis when the web is no longer being actively pulled, and in some instances can cause the web to continue turning uncontrollably. A roll of web that is turning uncontrollably can result in the web being uncontrollably dispensed, and can become tangled or damaged, among other undesirable outcomes.

When a web is in a wound form, one method of preventing the web from rotating when it is not being pulled is to add a braking mechanism, for example to the spindle. The braking mechanism can be used to inhibit the roll of web from rotating when the web is not being actively pulled. However, in some instances, the braking mechanism can increase the level of tension required to pull the web to cause the roll to rotate. Certain levels of tension may provide undesirable strains on the web, such as tensile forces along the length of the web, and in some instances can cause the web to break. The web 20 that is folded can be pulled from the stack 10 without the need for a brake, because when the web 20 is no longer being pulled, the web 20 does not continue to dispense. Because the stack 10 can be used to provide the web 20 without the need for a spindle or a brake, the tension on the web 20 as it is being drawn from the stack 10 can be kept lower, with greater control, and with greater consistency, than if a brake were used.

In some instances, when a web is dispensed from a roll, the tension along the web changes as the material dispenses from the roll. For example, the tension along the web can change as the diameter of the roll of web change. In a further example, the tension along the web often increases as the roll diameter decreases as the web is dispensed from the roll. The folded web disclosed herein provides a solution for dispensing the web with tension relatively constant over time as the web is depleted.

In some instances, when using a web wound into a roll, to dispense a section of web, the entire roll of web must rotate around the spindle. Using the folded embodiments disclosed herein, as the folded web is dispensed from the web, the web can move one layer at a time. As a result, the total amount of energy needed to dispense the web from a folded arrangement is lower relative to the energy required to dispense the web from a roll.

In some embodiments, the web 100 in a folded form occupies a greater amount of the interior volume of a package that the web 100 is positioned in than a web that is in a rolled form. For example, the web 100 that is in a folded form can occupy a greater amount of the interior volume of space, than a web that is in a rolled form, in a package that has corners because the folded form can be configured to extend to the corners of the package. In some instances, the web 100 that is in a folded form can occupy a greater amount of the interior volume of a package because it does not have an open space where a core would be if the web were in a rolled form. For example, a web that is in a rolled form typically does not occupy the full volume of an octahedral package because the rolled form leaves a space between the outer diameter of the roll and the corners of the octahedral package. The web 100 that is in a folded form can occupy a greater percentage of the interior volume of space, than a web that is in a rolled form, in a package that has corners. In some embodiments, the web 100 in a folded form can occupy from about 10 percent to about 50 percent more of the interior volume of a package than the space occupied by a web of the same width and length in a rolled form.

Figure 3:
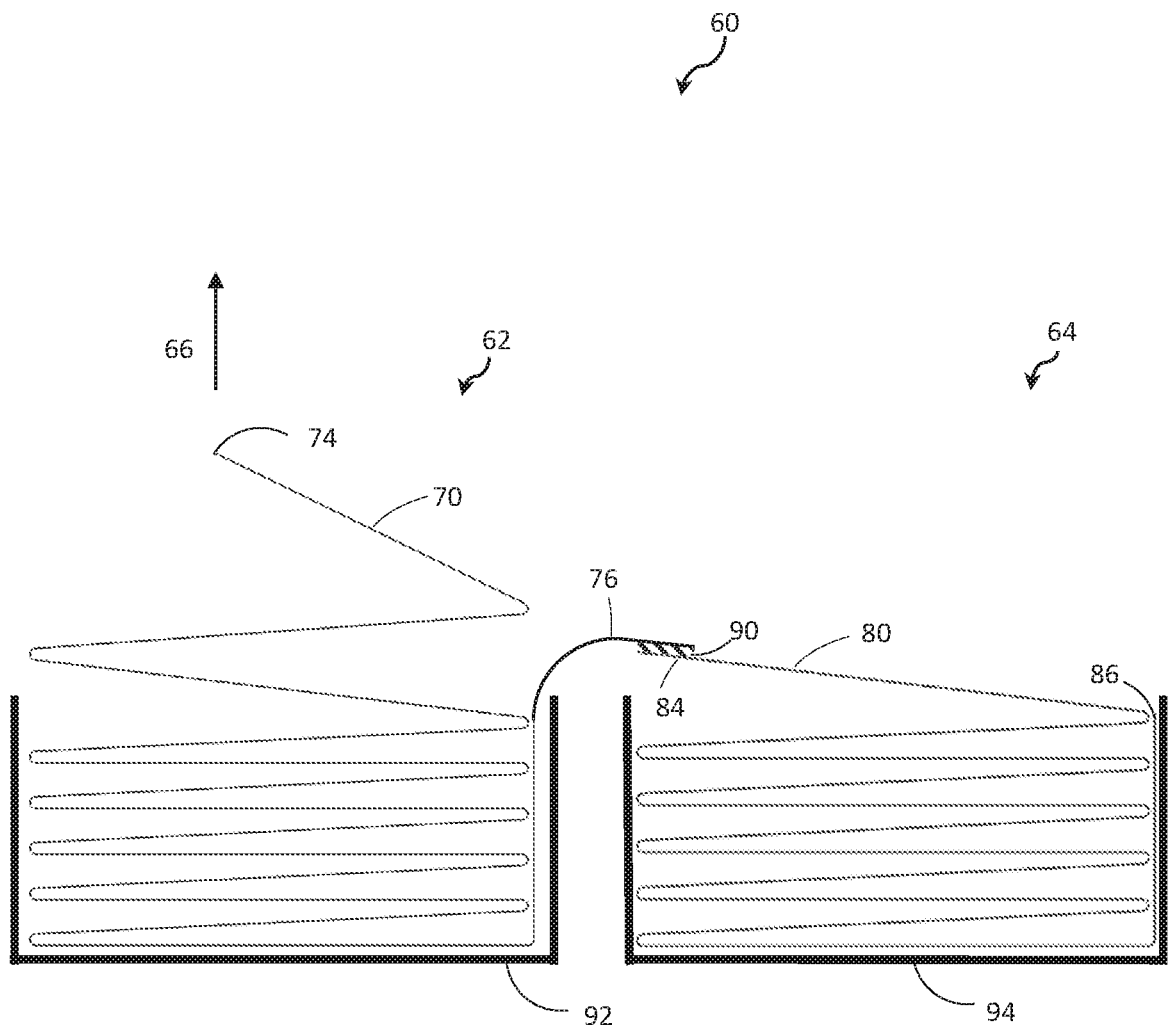
FIG. 3 is a front view of a system including a web arranged in accordance with certain embodiments.

FIG. 3 is a front view of a system 60 that includes a first stack 62 and a second stack 64. The first stack 62 includes a first web 70 having a first end 74, a second end 76, and a length in between. The second stack 64 includes a second web 80 having a first end 84, a second end 86, and a length in between. As shown in FIG. 3, the system 60 includes a connection 90, a first support frame 92, and a second support frame 94. In some embodiments, the connection 90 can be an adhesive tape, for example, a double-sided pressure sensitive adhesive tape.

In some embodiments, the system 60 dispenses the first and second webs 70, 80, for example by pulling the first and second webs 70, 80, in the direction shown by the arrow 66. For example, the first web 70 can be drawn from the first stack 62 by pulling the first end 74 of the first web 70 in the direction shown by the arrow 66. When the first web 70 is dispensed from the first stack 62, the second end 76 of the first web 70 can draw the second web 80 from the second stack 64. That is, the second end 76 can be drawn from the first stack 62 which pulls the first end 84 of the second stack 64 with the connection 90. The first end 84 of the second web 80 is then pulled and the second web 80 is dispensed from the second stack 64. Sequentially, any number of consecutive webs can be connected and dispensed by connecting to a previous web.

In some embodiments, the first support frame 92 can provide structural support to the first stack 62, for example as the first stack 62 is moved and/or the first web 70 is dispensed. In some embodiments, the second support frame 94 can provide support to the second stack 64, for example as the second stack 64 is moved and/or the second web 80 is dispensed. For example, the first support frame 92 can be arranged to support the first stack 62 from falling over, or unfolding, as the first stack 62 is moved into position or as the first web 70 is drawn. The first support frame 92 can be positioned to support the first stack 62 as the first stack 62 is moved into a desired location and can be removed once the first stack 62 is suitably positioned.

As shown in FIG. 3, with the system 60, the second stack 64 can be positioned proximate to the first stack 62. For example, the second stack 64 can be positioned in front, behind, or to either side of the first stack 64. In some instances, the first stack 62 can be first dispensed and then the user can position the second stack 64 where the first stack 62 was. A third stack (not shown) can then be moved into position where the second stack 64 previously was. In some embodiments, a fourth, fifth, or more stacks can be continuously moved into position and connected to a previous web before being dispensed. The system 60 provides a continuous process for dispensing webs from any suitable number of stacks.

Figure 4:
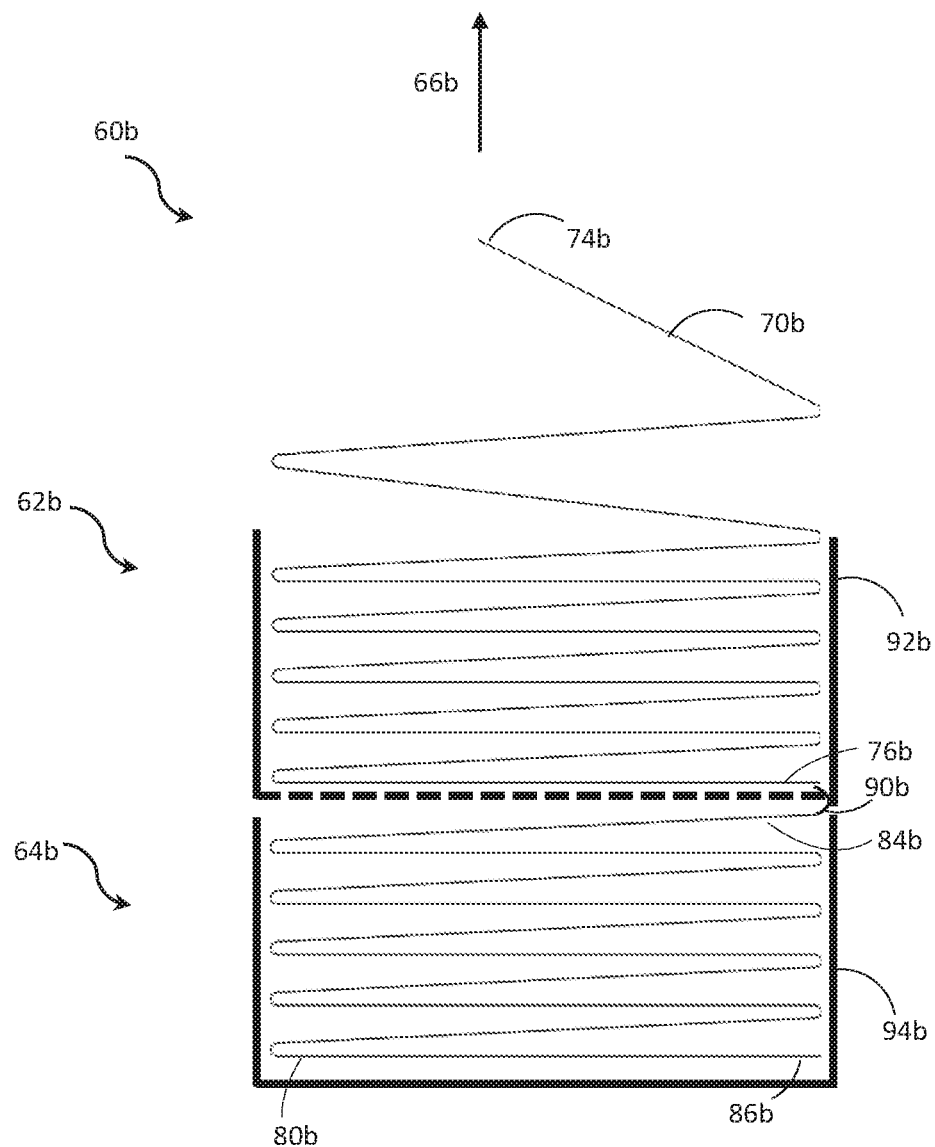
FIG. 4 is a front view of a system including a web arranged in accordance with certain embodiments.

FIG. 4 is a front view of a system 60b that includes a first stack 62b and a second stack 64b in another configuration. The first stack 62b includes a web 70b having a first end 74b a second end 76b and a length in between. The second stack 64b includes a web 80b having a first end 84b a second end 86b and a length in between. The system 60b includes a connection 90b, a first support frame 92b, and a second support frame 94b.

The system 60b dispenses the first and second webs 70, 80 by pulling in the direction shown by the arrow 66b. When the first web 70b is dispensed from the first stack 62b, the second end 76b of the first web 70b draws the second web 80b from the second stack 64b. The first end 84b of the second web 80b is then pulled and the second web 80b is dispensed from the second stack 64b.

As shown in FIG. 4, in some embodiments, the second stack 64b can be positioned beneath the first stack 62b. In some instances, the system 60b having the second stack 64b positioned beneath the first stack 62b provides a dispensing system having a smaller footprint than having the stacks (62b and 64b) positioned beside each other. In some embodiments, the first support frame 62b can have a bottom that is removable, such that the bottom of the first support frame can be opened to connect the first web 70 to the second web 80. For example, the first support frame 92b can include a slidable bottom that can be slid out from under the first stack 62. The first stack 62b can be first dispensed and then the user can position the second stack 64b where the first stack 62b was, for example with use of a lift system (not shown). A third stack (not shown) can then be moved into the position where the second stack 64b had been. In some embodiments, a fourth, fifth, or more stacks can be continuously moved into position and connected to a previous web before being dispensed. The system 60b provides a continuous process for dispensing webs from any suitable number of stacks.

In some embodiments, any number of consecutive webs may be connected and dispensed by connecting to a previous web. In some embodiments, any number of stacks can be positioned proximate to each other and the webs arranged in series. For example, the stacks can be positioned as shown in FIG. 4 in a generally upright orientation. In some embodiments, the stacks can be arranged on their sides, with the first ends of the webs positioned to one side, and the second ends of the webs positioned to the opposite side. In some embodiments, any suitable container (not shown) can be arranged with multiple stacks arranged in the container, with the webs of the multiple stacks connected to each other. In some embodiments, any suitable container can be arranged with multiple stacks arranged in the container, such that separate webs within the container can be dispensed at the same time.

As shown in FIGS. 3 and 4, a first web can be joined to a second web without unfolding the first web. A web that is in a wound form can be dispensed by rotating the web around the axis such that the web is unwound. In some instances, when wound webs are used, a splicing device or system is used to attach the trailing end of a first web to the leading end of a second web as the first web is finished unwinding from the roll. Dispense speeds when using a rolled web can often be limited due to the need to slow down the dispense speed when joining the first web to the second web. For example, to avoid breaking the connection at the splice, the dispense speed may be slowed down when splicing is taking place to avoid the splice from disconnecting. After the first web has been connected to the second web the angular velocity of the second web is increased from a splicing speed to a normal operating speed. This increase in angular velocity can apply added tension to the web, this can be experienced as a tension spike during a splice event. For example, decreasing the angular velocity to make the splice, followed by increasing the angular velocity to normal operating speeds may cause abrupt changes in angular momentum. Accelerating a web roll from a suitable splicing speed to a typical operating speed, can includes changes from almost a full stop, to about 400 meters/min (about 1,300 ft/min). Changes of this magnitude are difficult to do without requiring complicated, expensive solutions.

As shown in FIGS. 3 and 4, the second end (76, 76b) of the first web (70, 70b) can be connected to the first end (84, 84b) of the second web (80, 80b) without dispensing the first web (70, 70b) from the first stack (62, 62b). The second end (76, 76b) of the first web (70, 70b) can be connected to the first end (84, 84b) of the second web (80, 80b) without changing the speed that the first web (70, 70b) is being drawn from the first stack (62, 62b). Using the folded web, the tension along the length of the web can be controlled such that is relatively the same when moving from a first stack to a second stack. The web can be dispensed with a relatively constant tension because the tension does not change while a first stack of web is being joined to a second stack of web.

Figure 5:
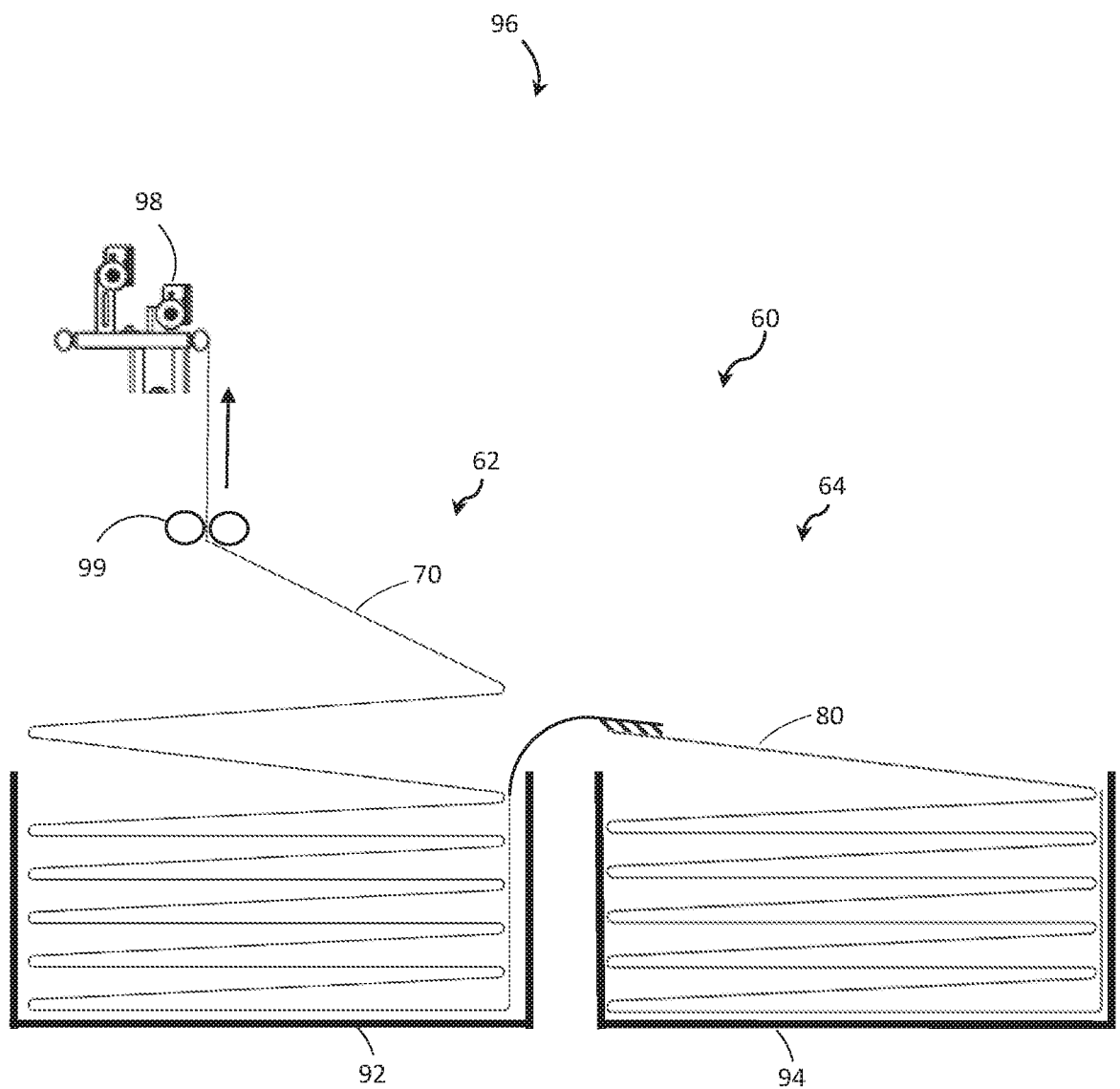
FIG. 5 is a front view of a system including a web arranged in accordance with certain embodiments.

FIG. 5 is a front view of an application layout 96 shown with the system 60 described with reference to FIG. 3. As shown, the application layout 96 includes the system 60, an application device 98, and an optional dispense controller 99. The system 60 can include the first stack 62 having the first web 70, second stack having the second web 80, the first support frame 92, and the second support frame 94. Although FIG. 5 is shown using system 60, any of the embodiments described in relation to the stack 10 shown in FIGS. 1 and 2, the system 60 shown in FIG. 3, or the system 60b shown in FIG. 4 can be used with an application layout 96.

As shown in FIG. 5, the system 60 can be positioned proximate the application device 98. The system 60 can be configured to provide a web, such as the first web 70, to the application device 98 in the direction shown by the arrow 66. For example, the first web 70 can be drawn from the first stack 62 in the direction shown by the arrow 66 such that the first web 70 unfolds from the first stack 62 and is provided to the application device 98.

The application device 98 can include any suitable device for applying a web to a substrate. For example, the application device 98 can be a tape applicator, suitable for applying a tape to a substrate. In some instances, the application device 98 may include an apparatus suitable for further processing the web before applying it. In some embodiments, the application device 98 may include a cutting apparatus, suitable for cutting a web before applying it. In some embodiments, an application device 98 can apply the web against a substrate and then cut the web to the desired length on the substrate. In some embodiments, the application device 98 may include an adhesion activation apparatus, suitable for activating an adhesive material, or an adhesive application apparatus, suitable for applying an adhesive material to the web before positioning the web along a substrate. For example, a suitable activation apparatus can include an activator that provides thermal, infrared (IR), ultraviolet (UV), chemical, moisture, or reactive activation, or a combination thereof, to an adhesive material such that the adhesive material becomes tacky. In some embodiments, the application device 98 can draw the web from a source, such as the system 60, activate the adhesive material, such as by heating the adhesive, cut the web, and apply the web to a substrate.

In some embodiments, a suitable application device 98 can position the web onto the substrate. For example, in some embodiments, the application device 98 can position the web between layers of linerboard for joining the boards together. The application device 98 can position the web to an outer linerboard to join the outer linerboard to an inner portion, such as a medium. In some instances, the application device 98 can provide heat and/or pressure for activating an adhesive of the web to be used to bond the linerboard to the medium. In some embodiments, the application device 98 can be a corrugator. For example, the application device 98 can join layers of fiberboard to form a cardboard construction. In some embodiments, the application device 98 can position the web as a reinforcing tape, such as for reinforcing a container. In some embodiments, the application device 98 can position the web on a container. For example, the application device 98 can position the web as a closing/opening tape to a container made from cardboard. The tape can be used to close the container, and to later open the container by tearing an opening in the container.

In some embodiments, a suitable application device may include a dispensing system such as those commercially available under the trade designation QUIK STAGE (from H.B. Fuller Company, of St. Paul, MN). In some embodiments, a suitable application device may be an intermittent tape applicator such as those commercially available under the trade designation ENFORCER (from H.B. Fuller Company, of St. Paul, MN) or those available from Straub Design Company (of Minneapolis, MN).

FIGS. 6 to 12 show various embodiments of a web to illustrate various features. The web described with reference to FIGS. 6 to 12 can be configured as any of the web 20 described with reference to FIGS. 1 and 2, the first web 70 and/or second web 80 described with reference to FIG. 3, and/or the first web 70b and/or second web 80b described with reference to FIG. 4.

Figure 6:
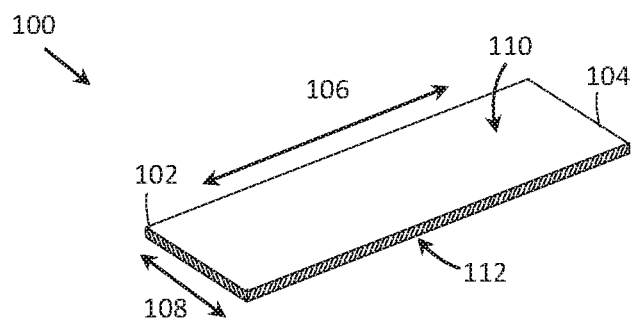
FIG. 6 is a perspective view of a web, in accordance with certain embodiments.

FIG. 6 shows a web 100 that defines a first end 102, second end 104, a length extending in between shown by the direction of the arrow 106, a width shown by the arrow 108, a first surface 110, and a second surface 112 on an opposite side of the web 100 as the first surface 110. In some embodiments, the first surface 110 of the web 100 corresponds to the first surface 40 of the web 20 described with reference to FIGS. 1 and 2. In some embodiments, the second surface 112 of the web 100 corresponds to the second surface 42 of the web 20 described with reference to FIGS. 1 and 2. The thickness of the web 100 is defined as the distance between the first surface 110 and the second surface 112.

The web 100 includes an adhesive material. In some embodiments, the adhesive material defines the surface of at least one side of the web 100. For example, an adhesive material may define the first surface 100 and the web can be free of a liner adjacent to the adhesive material. An adhesive material may define the second surface 112 and the web 100 can be free of a liner adjacent to the adhesive material.

In some embodiments, the web 100 includes only adhesive material. In some embodiments, the web 100 includes more than one adhesive material. In some embodiments, the web 100 can be formed of a self-supporting adhesive. As used herein, a "self-supporting adhesive" means an adhesive that maintains its structural integrity under the load of its own weight when formed into a film. A "self-supporting adhesive film" means an adhesive film that maintains its structural integrity under the load of its own weight in the absence of any substrate. As an example, the web 100 can include one adhesive material that is self-supporting such that the adhesive forms the entire thickness of the web 100. As another example, the web 100 can include an adhesive material positioned on a carrier, and the adhesive material can be one that would be self-supporting if formed into a web with no carrier. As another example, the web 100 can include a first adhesive material and a second adhesive material positioned on the first adhesive material, and the first adhesive material can be one that would be self-supporting if formed into a web with no carrier.

In some embodiments, the web 100 includes an adhesive material that is an activatable adhesive. That is, the adhesive can be activated with thermal, IR, UV, chemical, moisture, or reactive activation, or a combination thereof, such that the adhesive is tacky. In some embodiments, the web 100 does not include a pressure sensitive adhesive. Additionally, or alternatively, the web 100 can include a pressure sensitive adhesive. As used herein, a pressure sensitive adhesive is defined as material that requires a separation force of 0.5 N or greater after the adhesive contacts a substrate when the adhesive is at room temperature (from about 22° C. to about 25° C.). The web 100 can include an adhesive material that does not exhibit blocking. Blocking is undesirable adhesion between two surfaces of the adhesive material. For example, blocking occurs when two surfaces of the adhesive touch and the adhesive surfaces adhere to one another.

The web 100 can include an adhesive material that does not self-adhere at room temperature. As used herein, an adhesive material that does self-adhere is defined as a material that requires a separation force of 0.5 N/cm or greater as measured by test procedure PSTC 101 method F after a first face of the adhesive material contacts a second face of the adhesive material. For example, referring to FIG. 2, if the second surface 42 of the web 20 includes a self-adhering adhesive material and the second surface 42 contacts itself, such as if the web 20 is in a folded form having a facing relationship with itself, a separation force of 0.5 N/cm or greater will be needed to separate the contacted portions of the second surface 42 of the web 20.

Referring to FIG. 6, in a particularly useful embodiment, the web 100 includes an adhesive material along the first surface 110, the second surface 112, or both; and the adhesive material is a thermally activatable material such as a hot melt adhesive. The adhesive material can be an activatable adhesive that does not self-adhere before the adhesive material has been activated, such that the adhesive material can contact itself, such as by folding the web with a first section of the web 100 in a facing relationship with a second section of the web 100, and the first section of the web 100 can be separated from the second section of the web 100 separation force no greater than 0.5 N. In an example process, when the web is to be applied to a substrate, the adhesive material can be activated by heating the adhesive material before or after contacting a substrate such that the adhesive material becomes tacky, such that the web adheres to the substrate.

Figure 7:
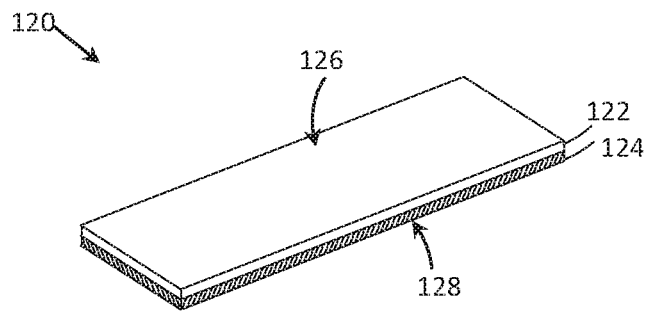
FIG. 7 is a perspective view of a web, in accordance with certain embodiments.

FIG. 7 shows a web 120 having a first layer 122 and a second layer 124. The first layer 122 defines a first surface 126 of the web 120, and the second layer 124 defines a second surface 128 of the web 120. In some embodiments, the first surface 126 of the web 120 corresponds to the first surface 40 of the web 20 described with reference to FIGS. 1 and 2. In some embodiments, the second surface 128 of the web 120 corresponds to the second surface 42 of the web 20 described with reference to FIGS. 1 and 2. The thickness of the web 120 is defined as the distance between the first surface 126 and the second surface 128.

In some embodiments, the first layer 122 includes an adhesive material and the second layer 124 includes a carrier material. In some embodiments, the adhesive material defines an outer surface of the web 120, such as the first surface 126 of the web 120. In some embodiments, the adhesive material may be positioned along a first side of the carrier such that the entire, or substantially the entire, first side of the carrier is covered by the adhesive material.

In some embodiments, the first layer 126 includes an adhesive material that is an activatable adhesive. For example, the first layer 126 may be an adhesive that is not tacky at ambient temperature. In some embodiments, the first layer 126 includes an adhesive material that does not self-adhere at room temperature. In some embodiments, the first layer 126 can be formed of a self-supporting adhesive. In some embodiments, the web 120 can include an adhesive material that does not exhibit blocking.

In some embodiments, suitable materials for forming the carrier may be any suitable material for forming a carrier for an adhesive tape, such as paper, or a polymer, such as a plastic, or a combination thereof.

In a particularly useful embodiment, the first layer 126 includes an adhesive material that defines the first surface 126 of the web 120. The adhesive material can be a thermally activatable material such as a hot melt adhesive. The adhesive material can be an activatable adhesive that does not self-adhere before the adhesive material has been activated, such that the adhesive material can contact itself, for example by folding the web, and can be separated with a separation force no greater than 0.5 N. In an example process, when the web is to be applied to a substrate the adhesive material can be activated by heating the adhesive material before or after contacting the substrate such that the adhesive material is tacky.

Figure 8:
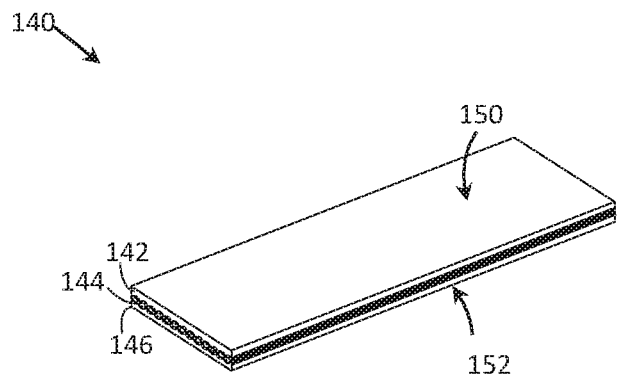
FIG. 8 is a perspective view of a web, in accordance with certain embodiments.

FIG. 8 shows a web 140 having a first layer 142, a second layer 144, and a third layer 146. The first layer 142 defines a first surface 150 of the web 140, and the third layer 146 defines a second surface 152 of the web 140. In some embodiments, the first surface 150 of the web 140 corresponds to the first surface 40 of the web 20 described with reference to FIGS. 1 and 2. In some embodiments, the second surface 152 of the web 140 corresponds to the second surface 42 of the web 20 described with reference to FIGS. 1 and 2. The thickness of the web 140 is defined as the distance between the first surface 150 and the second surface 152.

In some embodiments, the first layer 142 can include a liner material. For example, the first layer may be a liner material that can be separated from the second layer 144 before the second layer contacts a substrate. The first layer 142 can include a release surface configured to be in contact with an adhesive material and be easily separated from the adhesive material when the adhesive material is to be applied to a substrate. In some embodiments, suitable materials for forming a liner material include paper, film, non-woven materials, a scrim, and combinations thereof.

In some embodiments, the third layer 146 can include a carrier material. In some embodiments, suitable materials for forming the carrier may be any suitable material for forming a carrier for an adhesive tape, such as paper, or a polymer, such as a plastic, or a combination thereof.

In some embodiments, the second layer 144 includes an adhesive material. In some embodiments, the adhesive material may be positioned along a first side of the carrier such that the entire first side of the carrier is covered by the adhesive material. In some embodiments, the second layer 144 includes an adhesive material that is an activatable adhesive. In some embodiments, the second layer 144 includes an adhesive material that is not tacky at ambient temperature. In some embodiments, the second layer 144 includes an adhesive material that does not self-adhere at room temperature. The second layer 144 can include an adhesive material that does not exhibit blocking.

In a particularly useful embodiment, the second layer 144 includes an adhesive material that defines substantially the entire first surface 150 of the web 140 after the first layer 142 has been removed. In some embodiments, the second layer 144 can include a pressure sensitive adhesive that is tacky at room temperature.

Figure 9:
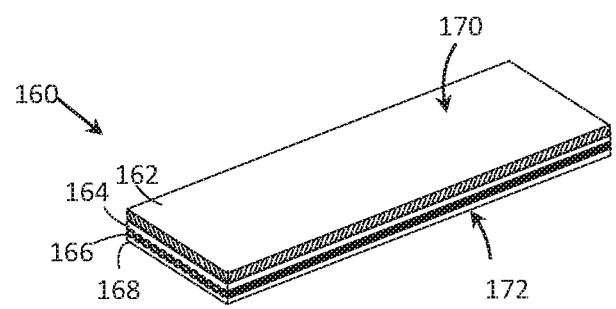
FIG. 9 is a perspective view of a web, in accordance with certain embodiments.

FIG. 9 shows a web 160 having a first layer 162, a second layer 164, a third layer 166, and a fourth layer 168. The first layer 162 defines a first surface 170 of the web 160, and the fourth layer 168 defines a second surface 172 of the web 160. In some embodiments, the first surface 170 of the web 160 corresponds to the first surface 40 of the web 20 described with reference to FIGS. 1 and 2. In some embodiments, the second surface 172 of the web 160 corresponds to the second surface 42 of the web 20 described with reference to FIGS. 1 and 2. The thickness of the web 160 is defined as the distance between the first surface 170 and the second surface 172.

In some embodiments, the first layer 162 can include a liner material. For example, the first layer 162 can be a liner material that can be separated from the second layer 164 before the second layer 164 contacts a substrate. For example, the first layer 162 can include a release surface configured to be in contact with an adhesive material and be easily separated from the adhesive material when the adhesive material is to be applied to a substrate. In some embodiments, suitable materials for forming a liner material include paper, film, non-woven materials, a scrim, and combinations thereof.

In some embodiments, the third layer 166 can include a carrier material. In some embodiments, suitable materials for forming the carrier may be any suitable material for forming a carrier for an adhesive tape, such as paper, or a polymer, such as a plastic, or a combination thereof.

In some embodiments, the second layer 164, the fourth layer 168, or both, include an adhesive material. In some embodiments, the adhesive material may be positioned along a first side of a carrier such that the entire first side of the carrier is covered by the adhesive material. In some embodiments, the adhesive material may be positioned along a second side of a carrier such that the entire second side of the carrier is covered by the adhesive material.

In some embodiments, the second layer 164 can include a first adhesive material and the fourth layer 168 can include a second adhesive material that is different than the first adhesive material. In some embodiments, the second layer 164 and the fourth layer 168 can include the same adhesive material. In some embodiments, the second layer 164 can include a pressure sensitive adhesive. In some embodiments, the fourth layer 168 includes an adhesive material that is an activatable adhesive. In some embodiments, one or both of the second layer 164 and fourth layer 168 includes an adhesive material that is not tacky at ambient temperature. In some embodiments, one or both of the second layer 164 and the fourth layer 168 includes an adhesive material that does not self-adhere at room temperature. In some embodiments, one or both of the second layer 164 and the fourth layer 168 can include an adhesive material that does not exhibit blocking.

In a particularly useful embodiment, the second layer 164 includes a first adhesive material that defines substantially the entire first surface 170 of the web 160 after the first layer 162 has been removed. The fourth layer 168 can include a second adhesive material that defines substantially the entire second surface 172 of the web 160. The fourth layer can include an activatable adhesive material, such as a thermally activatable adhesive. The second adhesive material may be an adhesive that does not self-adhere before the adhesive material has been activated, such that the second adhesive material can contact itself, for example by folding the web, and can be separated with a minimal separation force.

Figure 10:
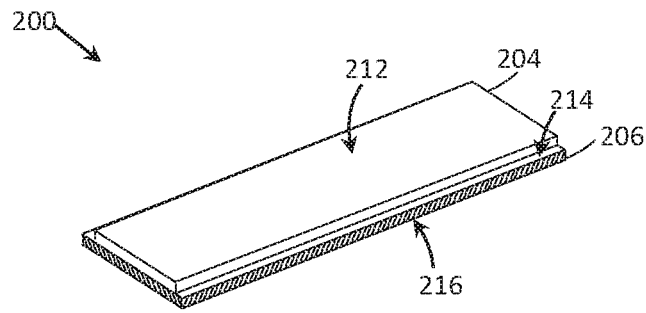

FIG. 10 shows a web 200 having a first layer 204 and a second layer 206. As shown, the first layer 204 defines a first surface 212, and the second layer 206 defines a first surface 214 and a second surface 216. In some embodiments, the web 200 includes a third layer (not shown from this view) on a side of the second layer 206 opposite the first layer 204. In some embodiments, the first layer 204 may be an adhesive layer, and the second layer 206 may be a carrier. In some embodiments, the third layer (not shown) can be an adhesive layer. As shown, the first layer 204 can be positioned such that it defines a width that is less than a width of the second layer 206, such that a section of the first surface 214 of the second layer 206 is not covered by the first layer 204. For example, as shown, the first layer 204 is positioned such that the second layer 206 has a section along the edges of the second layer 206 that is not covered by the first layer 204. In some embodiments, the third layer (not shown) defines a width that is less than a width of the second layer 206, such that a section of the second surface 216 along the edges of the second layer 206 is not covered by the third layer. In some embodiments, one or both of the first layer 204 and the third layer can include an adhesive material that does not exhibit blocking.

Figure 11:
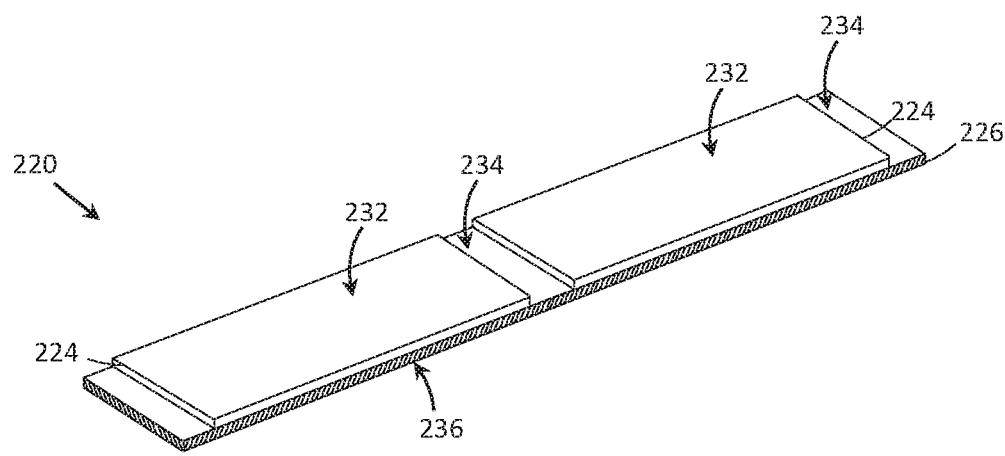

FIG. 11 shows a web 220 having a first layer 224 and a second layer 226. As shown, the first layer 224 defines a first surface 232, and the second layer 226 defines a first surface 234 and a second surface 236. In some embodiments, the web 220 includes a third layer (not shown from this view) on a side of the second layer 226 opposite the first layer 224. In some embodiments, the first layer 224 can be an adhesive layer. The second layer 226 can be a carrier layer. In some embodiments, the third layer (not shown) can be an adhesive layer. In some embodiments, one or both of the first layer 224 and the third layer can include an adhesive material that does not exhibit blocking.

As shown, the first layer 224 can be positioned in sections such that the combined length of the sections of the first layer define a length that is less than a length of the second layer 226. Suitable portions of the first surface 234 of the second layer 226 are not covered by the first layer 224. For example, as shown, the first layer 224 is positioned such that the second layer 226 has a portion along the length of the second layer 226 that is not covered by the first layer 224. As an example, the first layer 224 may positioned in sections spaced apart along the first surface 234 of the second layer 226 such that a portion of the first surface 234 is not covered by the first layer 224 in between sections of the first layer 224. In some embodiments, the third layer (not shown) defines a length that is less than a length of the second layer 226, such that a portion of the second surface 236 of the second layer 226 is not covered by the third layer.

The web 220 can be folded such that a turn is positioned at any suitable location. For example, the web 220 can be folded such that the turn is positioned at the section along the length of the second layer 226 that is not covered by the first layer 224. Alternatively, or additionally, the web 220 can be folded such that the turn is positioned at the section along the length of the second layer 226 that is covered by the first layer 224.

Figure 12:
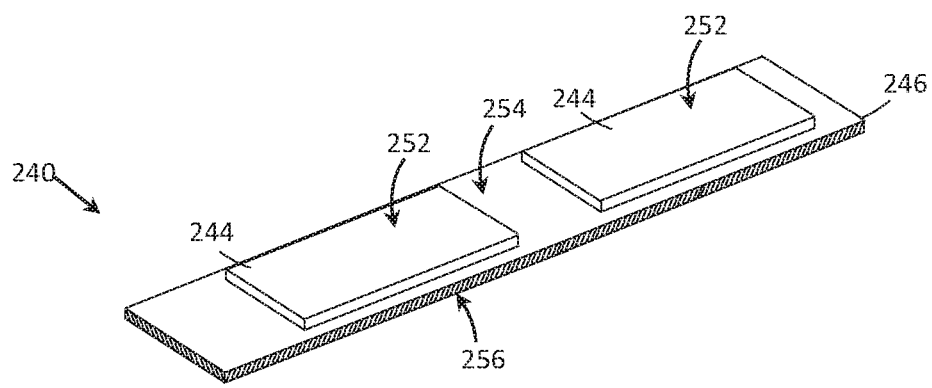

FIG. 12 shows a web 240 having a first layer 244 and a second layer 246. As shown, the first layer 244 defines a first surface 252, and the second layer 246 defines a first surface 254 and a second surface 256. In some embodiments, the web 240 includes a third layer (not shown from this view) on a side of the second layer 246 opposite the first layer 244. In some embodiments, the first layer 244 can be an adhesive layer. The second layer 246 can be a carrier layer. In some embodiments, the third layer (not shown) is an adhesive layer. In some embodiments, one or both of the first layer 244 and the third layer can include an adhesive material that does not exhibit blocking.

As shown, the first layer 254 can be positioned such that it defines a length and a width that are less than a length and a width of the second layer 246, such that portions of the first surface 254 of the second layer 256 are not covered by the first layer 244. For example, as shown, the first layer 244 is positioned such that the second layer 246 has a portion along the length of the second layer 246 and a portion along the edges that are not covered by the first layer 244. The first layer 244 can be positioned in sections spaced apart along the first surface 254 of the second layer 246 such that areas of the first surface 254 are not covered by the first layer 254. In some embodiments, the third layer (not shown) defines a length and a width that are less than a length and a width of the second layer 246, such that areas of the second surface 256 of the second layer 246 is not covered by the third layer.

The web 240 can be folded such that a turn is positioned at any suitable location. For example, the web 240 can be folded such that the turn is positioned at the section along the length of the second layer 246 that is not covered by the first layer 244. Alternatively, or additionally, the web 240 can be folded such that the turn is positioned at the section along the length of the second layer 246 that is covered by the first layer 244.

In some embodiments, the webs 100, 120, 140, 160 disclosed with reference to FIGS. 6 to 12 have a suitable tensile strength measured along the direction of the length (shown by arrow 106 in FIG. 6). For example, for webs having a thickness from about one mil (a mil is one thousandth of an inch) to about 20 mil, the web 100 can have a tensile strength from about one Newton (N) per centimeter (cm) width (shown by arrow 108 in FIG. 6) of the web, about 1.75 N per cm (about one lb. per inch), about five N, about 10 N, about 20 N, about 100 N, about 150 N, or about 200 N per cm width, to about 250 N, 300 N, 350 N, 400 N, or about 438 N per cm width (250 lb$_f$ per inch), or a value between any pair of the foregoing values.

Suitable commercially available webs may be any of the adhesive tapes available under the trade designations SESAME, KRAFT BACK, or RPT (from H.B. Fuller Company, of St. Paul, MN).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. An adhesive web article comprising:
   an adhesive web defining a first end, a second end, a length in between, a width, and a first adhesive defining a first adhesive surface,
   the adhesive web being folded over upon itself along the width such that a first portion of the first adhesive surface is in facing relationship and in direct contact with a second portion of the first adhesive surface,
   wherein the first adhesive is an activatable adhesive,
   the first adhesive being free of activation with the adhesive web folded over upon itself, and
   wherein the adhesive web is in the form of a fan-fold along the length of the adhesive web.

2. The adhesive web article of claim 1, wherein the first adhesive is configured to be activated with the adhesive web free from a folded form.

3. The adhesive web article of claim 1, wherein the adhesive web further comprises a second adhesive surface opposite the first adhesive surface.

4. The adhesive web article of claim 3, wherein a first portion of the second adhesive surface is in facing relationship with a second portion of the second adhesive surface.

5. The adhesive web article of claim 1, wherein the first adhesive includes a hot melt adhesive.

6. The adhesive web article of claim 1, wherein the adhesive web further includes a carrier.

7. The adhesive web article of claim 1, wherein the web is free of a carrier.

8. An adhesive web article comprising:
   a web comprising a self-supporting adhesive defining a first adhesive surface,
   the web having a first side, a second side opposite the first side, a first end, a second end, a length extending between the first end and the second end, and a width,
   wherein the web is in a folded form over upon itself along the width, such that a first portion of the first adhesive surface is in facing relationship and in direct contact with a second portion of the first adhesive surface,
   wherein the self-supporting adhesive is an activatable adhesive and is free of activation with the web being in the folded form, and
   wherein the web is in the form of a fan-fold along the length of the web.

9. The adhesive web article of claim 8, wherein the web is free of a liner.

10. The adhesive web article of claim 8, wherein the self-supporting adhesive is a hot melt adhesive.

* * * * *